US012459993B2

United States Patent
Croy et al.

(10) Patent No.: US 12,459,993 B2
(45) Date of Patent: Nov. 4, 2025

(54) ANTI-ALPHA-SYNUCLEIN ANTIBODIES AND USES THEREOF

(71) Applicant: Eli Lilly and Company, Indianapolis, IN (US)

(72) Inventors: Johnny Eugene Croy, Indianapolis, IN (US); Mansuo Lu Hayashi, Indianapolis, IN (US); Jirong Lu, Indianapolis, IN (US); Bo Ma, Indianapolis, IN (US); Ying Tang, Indianapolis, IN (US)

(73) Assignee: Eli Lilly and Company, Indianapolis, IN (US)

( * ) Notice: Subject to any disclaimer, the term of this patent is extended or adjusted under 35 U.S.C. 154(b) by 1179 days.

(21) Appl. No.: 17/413,771

(22) PCT Filed: Dec. 9, 2019

(86) PCT No.: PCT/US2019/065134
§ 371 (c)(1),
(2) Date: Jun. 14, 2021

(87) PCT Pub. No.: WO2020/123330
PCT Pub. Date: Jun. 18, 2020

(65) Prior Publication Data
US 2022/0048982 A1 Feb. 17, 2022

Related U.S. Application Data

(60) Provisional application No. 62/779,505, filed on Dec. 14, 2018.

(51) Int. Cl.
*C07K 16/18* (2006.01)
*A61K 39/00* (2006.01)

(52) U.S. Cl.
CPC ........ *C07K 16/18* (2013.01); *A61K 2039/505* (2013.01); *C07K 2317/14* (2013.01); *C07K 2317/34* (2013.01); *C07K 2317/565* (2013.01); *C07K 2317/92* (2013.01)

(58) Field of Classification Search
None
See application file for complete search history.

(56) References Cited

U.S. PATENT DOCUMENTS

| 8,609,820 B2 | 12/2013 | Saldanha et al. |
| 10,081,674 B2 | 9/2018 | Barbour et al. |
| 2008/0175838 A1 | 7/2008 | Schenk et al. |

(Continued)

FOREIGN PATENT DOCUMENTS

| CN | 102869680 A | 1/2013 | |
| WO | WO-2008068048 A2 * | 6/2008 | ............ A61P 31/10 |

(Continued)

OTHER PUBLICATIONS

Kussie et al., A single engineered amino acid substitution changes antibody fine specificity.J Immunol. Jan. 1, 1994; 152(1):146-52. ( (Year: 1994).*

(Continued)

*Primary Examiner* — Aurora M Fontainhas
(74) *Attorney, Agent, or Firm* — Quarles & Brady, LLP

(57) ABSTRACT

The present invention relates to anti-alpha-synuclein antibodies, and uses thereof for treating diseases such as Parkinson's disease.

25 Claims, 2 Drawing Sheets

Specification includes a Sequence Listing.

(56) References Cited

U.S. PATENT DOCUMENTS

| | | | |
|---|---|---|---|
| 2016/0108113 | A1 | 4/2016 | Ayalon et al. |
| 2017/0015739 | A1 | 1/2017 | Kallunki et al. |
| 2017/0174777 | A1 | 6/2017 | Barbour et al. |
| 2017/0355756 | A1* | 12/2017 | Julien .................... C07K 16/18 |
| 2018/0194833 | A1 | 7/2018 | Kallunki et al. |

FOREIGN PATENT DOCUMENTS

| | | | |
|---|---|---|---|
| WO | 2011104696 | A1 | 9/2011 |
| WO | 2012177972 | A1 | 12/2012 |
| WO | 2013063516 | A1 | 5/2013 |
| WO | 2015155694 | A1 | 10/2015 |
| WO | 2016061389 | A2 | 4/2016 |
| WO | 2017009312 | A1 | 1/2017 |
| WO | 2017207739 | A1 | 12/2017 |
| WO | 2018151821 | A1 | 8/2018 |

OTHER PUBLICATIONS

Chen et al., Enhancement and destruction of antibody function by somatic mutation: unequal occurrence is controlled by V gene combinatorial associations. EMBO J. Jun. 15, 1995;14(12):2784-94. (Year: 1995).*

Koenig et al., Mutational landscape of antibody variable domains reveals a switch modulating the interdomain conformational dynamics and antigen binding. PNAS Jan. 24, 2017 114 (4) E486-E495; first published Jan. 5, 2017; (Year: 2017).*

Edwards et al., The remarkable flexibility of the human antibody repertoire; isolation of over one thousand different antibodies to a single protein, BLyS. J Mol Biol. Nov. 14, 2003;334(1):103-18. (Year: 2003).*

Croisier E. et al., Comparative study of commercially available anti-a-synuclein antibodies, Neuropathology and Applied Neurobiology, 2006, vol. 32(3), pp. 351-356 (doi:10.1111/j.1365-2990.2006.00722.x).

Rudikoff, et al., "Single amino acid substitution altering antigen-binding specificity." PNAS, 1982; 79(6):1979-83, https://doi.org/10.1073/pnas.79.6.197.

Tamura, et al., "Structural Correlates of an Anticarcinoma Antibody: Identification of Specificity-Determining Residues (SDRs) and Development of a Minimally Immunogenic Antibody Variant by Retention of SDRs Only," J Immunol Feb. 1, 2000, 164 (3) 1432-1441; DOI: https://doi.org/10.4049/jimmunol.164.3.1432.

Vaikath et al., Antibodies against alpha-synuclein: tools and therapies, Journal of Neurochemistry, 2019, vol. 150, pp. 612-625 (doi:10.1111/jnc.14713).

Jakes R. et al., Epitope mapping of LB509, a monoclonal antibody directed against human α-synuclein, Neuroscience Letters, 1999, vol. 269, Issue 1, pp. 13-16.

Al-Lazikani et al., Standard Conformations for the Canonical Structures of Immunoglobulins, Journal of Molecular Biology, 1997, 273(4):927-948.

Chothia et al., Canonical Structures for the Hypervariable Regions of Immunoglobulins, Journal of Molecular Biology, 1987, 196(4):901-917.

Darling et al., Kinetic Exclusion Assay Technology: Characterization of Molecular Interactions, Assay and Drug Development Technologies, 2004, 2(6):647-657.

Dufty et al., Calpain-Cleavage of α-Synuclein: Connecting Proteolytic Processing to Disease-Linked Aggregation, American Journal of Pathology, 2007, 170(5):1725-1738.

Estep et al., High Throughput Solution-Based Measurement of Antibody-Antigen Affinity and Epitope Binning, MAbs, 2013, 5(2):270-278.

Games et al., Reducing C-Terminal-Truncated Alpha-Synuclein by Immunotherapy Attenuates Neurodegeneration and Propagation in Parkinson's Disease-Like Models, Journal of Neuroscience, 2014, 34(28):9441-9454.

Kabat et al., Attempts to Locate Complementarity-Determining Residues in the Variable Positions of Light and Heavy Chains, Annals of the New York Academy of Sciences, 1971, 190(1):382-393.

Kabat et al., Sequences of Proteins of Immunological Interest, Fifth Edition, U.S. Department of Health and Human Services, NIH Publication No. 91-3242, 1991 [Summary Only].

Mallbris et al., Molecular Insights Into Fully Human and Humanized Monoclonal Antibodies: What are the Differences and Should Dermatologists Care?, Journal of Clinical and Aesthetic Dermatology, 2016, 9(7):13-15.

North et al., A New Clustering of Antibody CDR Loop Conformations, Journal of Molecular Biology, 2011, 406(2):228-256.

Polinsi et al., Best Practices for Generating and Using Alpha-Synuclein Pre-Formed Fibrils to Model Parkinson's Disease in Rodents, Journal of Parkinson's Disease, 2018, 8(2):303-322.

Wang et al., Caspase-1 Causes Truncation and Aggregation of the Parkinson's Disease-Associated Protein α-synuclein, PNAS, 2016, 113(34):9587-9592.

Weiner, Fully Human Therapeutic Monoclonal Antibodies, Journal of Immunotherapy, 2006, 29(1):1-9.

Winkler et al., Changing the Antigen Binding Specificity by Single Point Mutations of an Anti-p24 (HIV-1) Antibody, Journal of Immunology, 2000, 165(8):4505-4514.

PCT International Search Report and Written Opinion, PCT/US2019/065134, Jun. 23, 2020, 27 pages.

* cited by examiner

ANTI-ALPHA-SYNUCLEIN ANTIBODIES AND USES THEREOF

CROSS-REFERENCE TO RELATED PATENT APPLICATIONS

The present application is the U.S. National Stage of International Patent Application No. PCT/US2019/065134, filed on Dec. 9, 2019, and published in the English language as WO 2020/123330 on Jun. 18, 2020, which application in turn claims the benefit of priority to U.S. Provisional Patent Application No. 62/779,505, filed on Dec. 14, 2018. The contents of the foregoing applications are incorporated herein by reference in their entireties.

SEQUENCE LISTING

This application is being filed electronically via EFS-Web and includes an electronically submitted Sequence Listing in .txt format. The .txt file contains a sequence listing entitled "2021 06-14_083389-00576_Sequence_Listing_as_Filed.txt" created on Jun. 12, 2021 and is 14,870 bytes in size. The Sequence Listing contained in this .txt file is part of the specification and is hereby incorporated by reference herein in its entirety.

The present invention is in the field of medicine. More particularly, the present invention relates to antibodies that bind to alpha-synuclein, compositions comprising such alpha-synuclein antibodies, and methods of using such alpha-synuclein antibodies for the treatment of synucleinopathies such as Parkinson's disease, multiple system atrophy, and Alzheimer's disease.

Alpha-synuclein (herein also referred to as α-synuclein) is a 140 amino acid presynaptic neuronal protein that is expressed abundantly in the nervous system and, under physiological conditions, localizes preferentially to presynaptic terminals. Alpha-synuclein has been linked to the pathogenesis of multiple neurodegenerative diseases called "synucleinopathies". These diseases share pathological hallmarks of intracellular inclusions composed of aggregated α-synuclein, either in neurons (e.g. Parkinson's disease (PD), Dementia with Lewy Bodies (DLB)) or in glia (e.g. Multiple System Atrophy (MSA)). In PD, these α-synuclein inclusions are observed in both cell body (namely "Lewy bodies") and neuronal processes (namely "Lewy neurites"). In Alzheimer's disease, about half of patients have co-pathology of α-synuclein with amyloid and tau.

In addition to this pathological link, mutations in the gene encoding α-synuclein (SNCA) have been found in familial PD, which generally renders α-synuclein with a higher propensity for aggregation. Furthermore, duplications and triplications of SNCA have been associated with familial PD, suggesting that over-expression of α-synuclein may lead to neurodegenerative deficits.

The temporal and regional spread of α-synuclein has been correlated with the progression of disease symptoms in PD. Additionally, proteolytic N-terminal and C-terminal fragments of α-synuclein that are generated by calpain and/or caspase cleavage have been reported to be unregulated in Lewy Body extracts of both PD and DLB patients. Furthermore, in vitro studies have shown that progressive truncation of the C-terminal end of α-synuclein imparts a higher intrinsic ability to form fibrillated, pathogenic aggregates (see e.g. Wang et al, (2016) Proc. Nat. Acad. Sci. 113(34): 9587-9592). Taken together, these observations suggest that fragmented α-synuclein has the potential to contribute to increased rates of disease progression and poor patient prognosis. Therefore, an antibody that binds to α-synuclein may have therapeutic efficacy in the treatment of synucleinopathies.

Alpha-synuclein antibodies are known in the art. For example, U.S. Pat. No. 8,609,820 discloses the humanized anti-α-synuclein antibody 9E4 and methods of treating or effecting prophylaxis of synucleopathies or Lewy Body Disease in patients suffering from or at risk of such diseases. However, current strategies associated with α-synuclein immunotherapy mainly employ antibodies that target epitopes such that the antibodies are not expected to bind and/or recognize calpain and/or caspase fragmented species, thereby likely providing sub-optimal efficacy.

Accordingly, there is a great need in the art for anti-alpha-synuclein antibodies that bind calpain and/or caspase-generated species of human α-synuclein. The unique alpha-synuclein epitope recognized by the antibodies of the present invention enables the antibodies to bind both full-length and fragmented α-synuclein aggregated species and likely imparts a greater degree of disease control in synucleinopathies such as PD and DLB.

In addition, the antibodies of the present invention are high affinity antibodies that have acceptable properties, such as in vivo PK and immunogenicity, and balance surface electrostatic potential, increase thermal stability, decrease pI, and/or reduce binding to non-antigen proteins.

Accordingly, the present invention provides an anti-alpha-synuclein antibody comprising a heavy chain (HC) and a light chain (LC), wherein the HC comprises a heavy chain variable region (HCVR) and the LC comprises a light chain variable region (LCVR), and wherein the HCVR comprises a HCDR1, HCDR2, and HCDR3, and the LCVR comprises a LCDR1, LCDR2, and LCDR3, wherein the amino acid sequence of the HCDR1 is given by SEQ ID NO: 1 (AASGFTFSSYAMS), the amino acid sequence of the HCDR2 is given by SEQ ID NO: 2 (AISGSGGDTYY-ADSVXG; wherein Xaa at position 16 is lysine or glutamine), the amino acid sequence of the HCDR3 is given by SEQ ID NO: 3 (ARGYGMDV), the amino acid sequence of the LCDR1 is given by SEQ ID NO: 4 RSSQXLVHSDGN-TYLM; wherein Xaa at position 5 is serine or aspartic acid), the amino acid sequence of the LCDR2 is given by SEQ ID NO: 5 (YKVSXRNS; wherein Xaa at position 5 is asparagine or aspartic acid), and the amino acid sequence of the LCDR3 is given by SEQ ID NO: 6 (MQGTKQYPT). In an embodiment, Xaa at position 16 of SEQ ID NO: 2 is lysine or glutamine. In an embodiment, Xaa at position 5 of SEQ ID NO: 4 is serine or aspartic acid. In an embodiment, Xaa at position 5 of SEQ ID NO: 5 is asparagine or aspartic acid. In a particular embodiment, Xaa at position 16 of SEQ ID NO: 2 is lysine, Xaa at position 5 of SEQ ID NO: 4 is serine, and Xaa at position of SEQ ID NO: 5 is asparagine. In another particular embodiment, Xaa at position 16 of SEQ ID NO: 2 is glutamine, Xaa at position 5 of SEQ ID NO: 4 is aspartic acid, and Xaa at position 5 of SEQ ID NO: 5 is aspartic acid.

The present invention also provides an anti-alpha-synuclein antibody comprising a HC and a LC, wherein the HC comprises a HCVR and the LC comprises a LCVR, and wherein the amino acid sequence of the HCVR is given by SEQ ID NO: 7 (XVQLLESGGGLVQPGGSLRLS-CAASGFTFSSYAMSWVRQAPGKGLEWVSAISGS GGDTYYADSVXGRFTISRDNSKNTLYLQMNSLRAE-DTAVYYCARGYGMDVWG QGTTVTVSS; wherein Xaa at position 1 is glutamic acid or pyroglutamic acid, and wherein Xaa at position 65 is lysine or glutamine), and wherein the amino acid sequence of the LCVR is given by SEQ ID NO: 8 (DVVMTQSPLSLPVTLGQPASISCRS SQXLVHSDGNTYLMWFQQRPGQSPRRLIY KVSXRN-SGVPDRFSGSGSGTDFTLKISRVEAEDVGVY YCM QGTKQYPTFGQGTK LEIK; wherein Xaa at position 28 is serine or aspartic acid, and wherein Xaa at position 58 is asparagine or aspartic acid). In an embodiment, Xaa at position 1 of SEQ ID NO: 7 is glutamic acid or pyroglutamic acid. In an embodiment, Xaa at position 65 of SEQ ID NO: 7 is lysine or glutamine. In an embodiment, Xaa at position 28 of SEQ ID NO: 8 is serine or aspartic acid. In an embodiment, Xaa at position 58 of SEQ ID NO: 8 is asparagine or aspartic acid. In a particular embodiment, Xaa at position 1 of SEQ ID NO: 7 is glutamic acid, Xaa at position 65 of SEQ ID NO: 7 is lysine, Xaa at position 28 of SEQ ID NO: 8 is serine, and Xaa at position 58 of SEQ ID NO: 8 is asparagine. In another particular embodiment, Xaa at position 1 of SEQ ID NO: 7 is glutamic acid, Xaa at position 65 of SEQ ID NO: 7 is glutamine, Xaa at position 28 of SEQ ID NO: 8 is aspartic acid, and Xaa at position 58 of SEQ ID NO: 8 is aspartic acid.

The present invention also provides an anti-alpha-synuclein antibody comprising a HC and a LC, wherein the amino acid sequence of the HC is given by SEQ ID NO: 9 (XVQLLESGGGLVQPGGSLRLSCAASGFTFSSYAM-SWVRQAPGKGLEWVSAISGS GGDTYYADSVXGR FTISRDNSKNTLYLQMNSLRAEDTAVYYCARGYGM DVWG QGTTVTVSSASTKGPSVFPLAPCSRSTSESTA ALGCLVKDYFPEPVTVSWNSGALT SGVHTFPAVL QSSGLYSLSSVVTVPSSSLGTKTYTCNVDHKPSN TK VDKRVESKY GPPCPPCPAPEAAGGPSVFLFPPK PK DTLMISRTPEVTCVVVDVSQEDPEVQFNW YVDGVE VHNAKTKPREEQFNSTYRVVSVLTVLHQDWLNG KE YKCKVSNKGLPS SIEKTISKAKGQPREPQVYTLPP-SQEEMTKNQVSLTCLVKGFYPSDIAVEWESNGQ PEN-NYKTTPPVLDSDGSFFLYSRLTVDKSRWQEGNVFSC SVMHEALHNHYTQKS LSLSLX; wherein Xaa at position 1 is glutamic acid or pyroglutamic acid, wherein Xaa at position 65 is lysine or glutamine, and wherein Xaa at position 441 is glycine or absent), and the amino acid sequence of the LC is given by SEQ ID NO: 10 (DVVMTQSPLSLPVTLGQPASISCRSSQXLVHSDGN-TYLMWFQQRPGQSPRRLIY KVSXRNSGVPDR FSGS GSGTDFTLKISRVEAEDVGVYYCMQGTKQYPTF GQGTK LEIKRTVAAPSVFIFPPSDEQLKSGTASVVC L LNNFYPREAKVQWKVDNALQSGN SQESVTEQDSK DSTYSLS STLTLSKADYEKHKVYACEVTHQGLSS PVTKSFNRGE C; wherein Xaa at position 28 is serine or aspartic acid, and wherein Xaa at position 58 is asparagine or aspartic acid). In an embodiment, Xaa at position 1 of SEQ ID NO: 9 is glutamic acid or pyroglutamic acid. In an embodiment, Xaa at position 65 of SEQ ID NO: 9 is lysine or glutamine. In an embodiment, Xaa at position 441 of SEQ ID NO: 9 is glycine or absent. In an embodiment, Xaa at position 28 of SEQ ID NO: 10 is serine or aspartic acid, and Xaa at position 58 of SEQ ID NO: 10 is asparagine or aspartic acid. In a particular embodiment, Xaa at position 1 of SEQ ID NO: 9 is glutamic acid, Xaa at position 65 of SEQ ID NO: 9 is lysine, Xaa at position 441 of SEQ ID NO: 9 is glycine, Xaa at position 28 of SEQ ID NO: 10 is serine, and Xaa at position 58 of SEQ ID NO: 10 is asparagine. In another particular embodiment, Xaa at position 1 of SEQ ID NO: 9 is glutamic acid, Xaa at position 65 of SEQ ID NO: 9 is glutamine, Xaa at position 441 of SEQ ID NO: 9 is glycine, Xaa at position 28 of SEQ ID NO: 10 is aspartic acid, and Xaa at position 58 of SEQ ID NO: 10 is aspartic acid.

The present invention also provides a pharmaceutical composition comprising an antibody of the present invention, and one or more pharmaceutically acceptable carriers, diluents, or excipients.

The present invention provides a method of treating a patient having a synocleinopathy, comprising administering to the patient an effective amount of an antibody of the present invention. In an embodiment, the synocleinopathy is PD, MSA, or AD. In a particular embodiment, the synocleinopathy is DLB. In another particular embodiment, the synocleinopathy is PD.

The present invention also provides an antibody of the present invention for use in therapy. In an embodiment, the antibody of the present invention is for usein the treatment of a synocleinopathy. In an embodiment, the synocleinopathy is PD, MSA, or AD. In a particular embodiment, the synocleinopathy is DLB. In another particular embodiment, the synocleinopathy is PD.

The present invention provides the use of an antibody of the present invention in the manufacture of a medicament for the treatment of a synocleinopathy. In an embodiment, the synocleinopathy is Parkinson's Disease (PD), multiple system atrophy (MSA), Alzheimer's disease (AD), or dementia with Lewy body (DLB).

The present invention also provides a DNA molecule comprising a polynucleotide that encodes the antibody HC whose amino acid sequence is given by SEQ ID NO: 9. In an embodiment, the DNA molecule has the polynucleotide sequence given by SEQ ID NO: 11.

The present invention also provides a DNA molecule comprising a polynucleotide that encodes the antibody LC whose amino acid sequence is given by SEQ ID NO: 10. In an embodiment, the DNA molecule has the polynucleotide sequence given by SEQ ID NO: 12.

The present invention provides a DNA molecule comprising a polynucleotide that encodes the HC whose amino acid sequence is given by SEQ ID NO: 9, and comprising a polynucleotide that encodes the LC whose amino acid sequence is given by SEQ ID NO: 10. In an embodiment, the sequence of the polynucleotide that encodes the HC is given by SEQ ID NO: 11, and the sequence of the polynucleotide that encodes the LC is given by SEQ ID NO: 12.

The present invention also provides a mammalian cell transformed with a DNA molecule comprising a polynucleotide that encodes the antibody HC whose amino acid sequence is given by SEQ ID NO: 9 and a DNA molecule comprising a polynucleotide that encodes the antibody LC whose amino acid sequence is given by SEQ ID NO: 10, which transformed mammalian cell is capable of expressing an antibody comprising two HCs and two LCs, in which the amino acid sequence of each HC is given by SEQ ID NO: 9, and the amino acid sequence of each LC is given by SEQ ID NO: 10.

The present invention also provides a mammalian cell transformed with a DNA molecule comprising 1) a polynucleotide that encodes the HC whose amino acid sequence is given by SEQ ID NO: 9, and 2) a polynucleotide that encodes the LC whose amino acid sequence is given by SEQ ID NO: 10, which transformed mammalian cell is capable of expressing an antibody comprising two HCs and two LCs, in which the amino acid sequence of each HC is given by SEQ ID NO: 9, and the amino acid sequence of each LC is given by SEQ ID NO: 10.

The present invention provides a process for producing an antibody, which antibody comprises two HCs and two LCs, in which the amino acid sequence of each HC is given by SEQ ID NO: 9 and the amino acid sequence of each LC is given by SEQ ID NO: 10, and which process comprises cultivating a mammalian cell transformed with a DNA molecule comprising a polynucleotide that encodes the antibody HC whose amino acid sequence is given by SEQ ID NO: 9 and a DNA molecule comprising a polynucleotide that encodes the antibody LC whose amino acid sequence is given by SEQ ID NO: 10, which transformed mammalian cell is capable of expressing an antibody comprising two HCs and two LCs, in which the amino acid sequence of each HC is given by SEQ ID NO: 9, and the amino acid sequence of each LC is given by SEQ ID NO: 10, under conditions such that the antibody is expressed, and recovering the expressed antibody. In an embodiment, the present invention provides an antibody obtainable by the process for producing an antibody.

The present invention provides a process for producing an antibody, which antibody comprises two HCs and two LCs, in which the amino acid sequence of each HC is given by SEQ ID NO: 9 and the amino acid sequence of each LC is given by SEQ ID NO: 10, and which process comprises cultivating a mammalian cell transformed with a DNA molecule comprising a polynucleotide that encodes the HC whose amino acid sequence is given by SEQ ID NO: 9, and comprising a polynucleotide that encodes the LC whose amino acid sequence is given by SEQ ID NO: 10, which transformed mammalian cell is capable of expressing an antibody comprising two HCs and two LCs, in which the amino acid sequence of each HC is given by SEQ ID NO: 9, and the amino acid sequence of each LC is given by SEQ ID NO: 10, under conditions such that the antibody is expressed, and recovering the expressed antibody. In an embodiment, the present invention provides an antibody obtainable by the process for producing an antibody.

The present invention also provides an alpha-synuclein antibody that binds human alpha-synuclein at one or more of residues aspartic acid at position 115, methionine at position 116, aspartic acid at position 119, glutamic acid at position 126, and proline at position 128 of SEQ ID NO: 13. In an embodiment, the antibody binds at least two amino acids of residues aspartic acid at position 115, methionine at position 116, aspartic acid at position 119, glutamic acid at position 126, and proline at position 128 of SEQ ID NO: 13. In another embodiment, the antibody binds at least three amino acids of residues aspartic acid at position 115, methionine at position 116, aspartic acid at position 119, glutamic acid at position 126, and proline at position 128 of SEQ ID NO: 13. In another embodiment, the antibody binds at least four amino acids of residues aspartic acid at position 115, methionine at position 116, aspartic acid at position 119, glutamic acid at position 126, and proline at position 128 of SEQ ID NO: 13. In another embodiment, the antibody binds residues aspartic acid at position 115, methionine at position 116, aspartic acid at position 119, glutamic acid at position 126, and proline at position 128 of SEQ ID NO: 13. In some such embodiments, the binding is determined by alanine scanning. It is believed that these antibodies might be more efficacious in removing cleaved alpha-synuclein in addition to full-length alpha-synuclein.

The present invention provides an antibody that inhibits uptake an alpha-synuclein fragment comprising residues 1-121 of SEQ ID NO: 13. The present invention also provides an antibody that inhibits uptake of an alpha-synuclein fragment comprising residues 120-140 of SEQ ID NO: 13. In some embodiments, the antibody inhibits uptake of both 1-121 and 120-140 fragments. The present invention also provides an antibody that binds an alpha-synuclein fragment comprising residues 1-120 of SEQ ID NO: 13. The present invention also provides an antibody that binds an alpha-synuclein fragment comprising residues 120-140 of SEQ ID NO: 13. In an embodiment, the antibody binds both 1-120 and 120-140 alpha-synuclein fragments.

DEFINITIONS

Figure 1A:
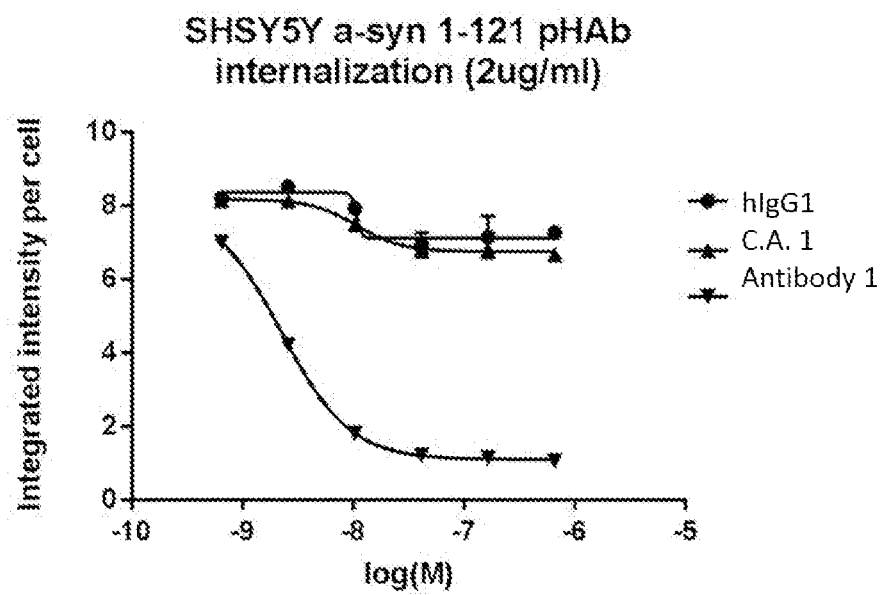
FIG. 1a. Inhibition of alpha-synuclein 1-121 fragment internalization.

As used herein, unless otherwise stated, alpha-synuclein refers to a wild-type alpha-synuclein, and preferably, to a wild-type human alpha-synuclein that has the amino acid sequence given by SEQ ID NO: 13. An "anti-alpha-synuclein antibody" or "alpha-synuclein antibody" refers to an antibody that preferentially binds to dimerized forms of alpha-synuclein, and when administered in vitro or in vivo, results in an achieved response such as at least one significantly lessened desired activity such as aggregation of alpha-synuclein and prevention of alpha-synuclein aggregate uptake into cells.

The term "aggregated" or "aggregation" as used herein refers to assemblies comprised of greater than one alpha-synuclein monomer.

"Seeding" refers to induction of intracellular aggregation. Specifically, seeding refers to the uptake of extracellular alpha-synuclein into cells and induction of monomeric pools of alpha-synuclein to form aggregates.

The term "antibody" as used herein refers to an engineered, non-naturally occurring polypeptide complex having two heavy chains (HC) and two light chains (LC) such that the heavy chains and the light chains are interconnected by disulfide bonds, wherein the antibody is an IgG isotype antibody. Each heavy chain is comprised of an N-terminal HCVR and a heavy chain constant region. Each light chain is comprised of an N-terminal LCVR and a light chain constant region. When expressed in certain biological systems, antibodies are glycosylated in the Fc region. Typically, glycosylation occurs in the Fc region of the antibody at a highly conserved N-glycosylation site. N-glycans typically attach to asparagine. Antibodies may be glycosylated at other positions as well.

Antibodies of the present invention lack effector function. Preferably, antibodies of the present invention are IgG4PAA antibodies. An IgG4PAA antibody is an IgG4 antibody having a serine to proline substitution and two leucine to alanine substitutions at positions (according to EU numbering) 228, 234, 235, respectively (S228P, F234A, L235A). S228P mutation eliminates half antibody formation. The two alanine mutations are known to disrupt hydrophobic interactions with FcγRs to eliminate residual effector function.

The constant region of the heavy chains contains CH1, CH2, and CH3 domains. CH1 comes after the HCVR; the CH1 and HCVR form the heavy chain portion of an antigen-binding (Fab) fragment, which is the part of an antibody that binds antigen(s). CH2 comes after the hinge region and before CH3. CH3 comes after CH2 and is at the carboxy-terminal end of the heavy chain. The constant region of the light chains contains one domain, CL. CL comes after the LCVR; the CL and LCVR form the light chain portion of a Fab.

The HCVR and LCVR regions of an antibody of the present invention can be further subdivided into regions of hyper-variability, termed complementarity determining regions ("CDRs"), interspersed with regions that are more conserved, termed framework regions ("FR"). Each HCVR and LCVR is composed of three CDRs and four FRs, arranged from amino-terminus to carboxy-terminus in the following order: FR1, CDR1, FR2, CDR2, FR3, CDR3, FR4. Herein, the three CDRs of the heavy chain are referred to as "HCDR1, HCDR2, and HCDR3" and the three CDRs of the light chain are referred to as "LCDR1, LCDR2 and LCDR3". The CDRs contain most of the residues which form specific interactions with the antigen. The Kabat CDR definition (Kabat, et al., Ann. NY Acad. Sci. 190:382-93 (1971); Kabat et al., Sequences of Proteins of Immunological Interest, Fifth Edition, U.S. Department of Health and Human Services, NIH Publication No. 91-3242 (1991)) is based upon antibody sequence variability. The Chothia CDR definition (Chothia et al., "Canonical structures for the hypervariable regions of immunoglobulins", Journal of Molecular Biology, 196, 901-917 (1987); Al-Lazikani et al., "Standard conformations for the canonical structures of immunoglobulins", Journal of Molecular Biology, 273, 927-948 (1997)) is based on three-dimensional structures of antibodies and topologies of the CDR loops. The Chothia CDR definitions are identical to the Kabat CDR definitions with the exception of HCDR1 and HCDR2. The North CDR definition (North et al., "A New Clustering of Antibody CDR Loop Conformations", Journal of Molecular Biology, 406, 228-256 (2011)) is based on affinity propagation clustering with a large number of crystal structures. For the purposes of the present invention, assignment of amino acids to CDR domains within the LCVR and HCVR regions of the antibodies of the present invention is based on the well-known Kabat numbering convention and North numbering convention. In the case of the light chain CDRs of the antibodies of the present invention, the North CDR definitions are used. In the heavy chain, both HCDR1 and HCDR3 also use the North definition. HCDR2 uses a hybrid of North and Kabat definitions. The North definition is used to identify the starting N-terminal site while Kabat is used to define the last position.

The present invention contemplates that the antibodies of the present invention are humanized or human antibodies. In the context of monoclonal antibodies, the terms "human" and "humanized" are well-known to those of ordinary skill in the art (Weiner L J, J. Immunother. 2006; 29: 1-9; Mallbris L, et al., J. Clin. Aesthet. Dermatol. 2016; 9: 13-15).

A DNA molecule of the present invention is a DNA molecule that comprises a non-naturally occurring polynucleotide sequence encoding a polypeptide having the amino acid sequence of at least one of the polypeptides in an antibody of the present invention (e.g., heavy chain, light chain, variable heavy chain, and variable light chain).

An isolated DNA encoding a HCVR region can be converted to a full-length heavy chain gene by operably linking the HCVR-encoding DNA to another DNA molecule encoding heavy chain constant regions. The sequences of human, as well as other mammalian, heavy chain constant region genes are known in the art. DNA fragments encompassing these regions can be obtained, e.g., by standard PCR amplification.

An isolated DNA encoding a LCVR region may be converted to a full-length light chain gene by operably linking the LCVR-encoding DNA to another DNA molecule encoding a light chain constant region. The sequences of human, as well as other mammalian, light chain constant region genes are known in the art. DNA fragments encompassing these regions can be obtained by standard PCR amplification. The light chain constant region can be a kappa or lambda constant region. Preferably, for antibodies of the present invention, the light chain constant region is a kappa constant region.

The polynucleotides of the present invention can be expressed in a host cell after the sequences have been operably linked to an expression control sequence. The expression vectors are typically replicable in the host organisms either as episomes or as an integral part of the host chromosomal DNA. Commonly, expression vectors will contain selection markers, e.g., tetracycline, neomycin, and dihydrofolate reductase, to permit detection of those cells transformed with the desired DNA sequences.

The antibodies of the present invention can readily be produced in mammalian cells, non-limiting examples of which includes CHO, NS0, HEK293 or COS cells. The host cells are cultured using techniques well known in the art.

The vectors containing the polynucleotide sequences of interest (e.g., the polynucleotides encoding the polypeptides of the antibody and expression control sequences) can be transferred into the host cell by well-known methods, which vary depending on the type of cellular host.

Various methods of protein purification may be employed to purify proteins, including, but not limited to, antibodies and such methods are known in the art.

An antibody of the present invention, or a pharmaceutical composition comprising the same, may be administered by parenteral routes, non-limiting examples of which are subcutaneous administration and intravenous administration. An antibody of the present invention may be administered to a patient with pharmaceutically acceptable carriers, diluents, or excipients in single or multiple doses. Pharmaceutical compositions of the present invention can be prepared by methods well known in the art (e.g., Remington: The Science and Practice of Pharmacy, 22nd ed. (2012), A. Loyd et al., Pharmaceutical Press) and comprise an antibody, as disclosed herein, and one or more pharmaceutically acceptable carriers, diluents, or excipients.

The term "treating" (or "treat" or "treatment") refers to slowing, interrupting, arresting, alleviating, stopping, reducing, or reversing the progression or severity of an existing symptom, disorder, condition, or disease.

"Effective amount" means the amount of an anti-alpha-synuclein antibody of the present invention or pharmaceutical composition comprising such an antibody that will elicit the biological or medical response of or desired therapeutic effect on a tissue, system, animal, mammal, or human that is being sought by the researcher, medical doctor, or other clinician. An effective amount of the antibody may vary according to factors such as the disease state, age, sex, and weight of the individual, and the ability of the antibody to elicit a desired response in the individual. Such benefit includes, but is not limited to reduced spread of pathological Lewy Bodies, improved motor function, and/or improvements in cognition. An effective amount can be readily determined by one skilled in the art, by the use of known techniques, and by observing results obtained under analogous circumstances. In determining the effective amount for a patient, a number of factors are considered by the attending diagnostician, including, but not limited to: the patient's size, age, and general health; the specific disease or disorder involved; the degree of, or involvement, or the severity of the disease or disorder; the response of the individual patient; the particular compound administered; the mode of administration; the bioavailability characteristics of the preparation administered; the dose regimen selected; the use of concomitant medication; and other relevant circumstances.

As used herein, the term "synucleinopathy" refers to a neurodegenerative disease or family of neurodegenerative disease characterized by the abnormal accumulation of aggregates of α-synuclein protein in neurons. Exemplary conditions include Alzheimer's Disease (AD), Parkinson's disease (PD), dementia with Lewy bodies (DLB), and multiple system atrophy (MSA).

EXAMPLES

Example: Antibody Expression and Purification

Anti-alpha-synuclein antibodies of the present invention can be expressed and purified essentially as follows. An appropriate host cell, such as HEK 293 or CHO, can be either transiently or stably transfected with an expression system for secreting antibodies using an optimal predetermined HC:LC vector ratio (such as 1:3 or 1:2) or a single vector system encoding both the HC and the LC. Clarified media, into which the antibody has been secreted, may be purified using any of many commonly-used techniques. For example, the medium may be applied to a MabSelect® column (GE Healthcare), or KappaSelect column (GE Healthcare) for Fab fragment, that has been equilibrated with a compatible buffer, such as phosphate buffered saline (pH 7.4). The column may be washed to remove nonspecific binding components.

The bound antibody may be eluted, for example, by pH gradient (such as 20 mM Tris buffer, pH 7.0 to 10 mM sodium citrate buffer, pH 3.0, or phosphate buffered saline pH 7.4 to 100 mM glycine buffer, pH 3.0). Antibody fractions may be detected, such as by SDS-PAGE, and then may be pooled. Further purification is optional, depending on intended use. The antibody may be concentrated and or sterile filtered using common techniques. Soluble aggregate and multimers may be effectively removed by common techniques, including size exclusion, hydrophobic interaction, ion exchange, multimodal, or hydroxyapatite chromatography. The purity of the antibody after these chromatography steps is between about 95% to about 99%.

It is expected that a low percentage (about 1%) of the glutamic acid at the N-terminus of the antibody heavy chain may be converted to pyroglutamic acid. In addition, a low percentage (about less than 1%) of the glycine at the C-terminus of the antibody heavy chain may be truncated (clipped) post-translationally.

The product may be held refrigerated, immediately frozen at −70° C., or may be lyophilized. Amino acid SEQ ID NOs for exemplified human antibodies of the present invention are shown below in Table 1.

TABLE 1

Amino acid sequences of Antibody 1 and Antibody 2.
Antibody SEQ ID Nos

| Antibody | HCDR1 | HCDR2 | HCDR3 | LCDR1 | LCDR2 | LCDR3 |
|---|---|---|---|---|---|---|
| Antibody 1 | SEQ ID NO: 1 | SEQ ID NO: 2 Xaa at position 16 is lysine | SEQ ID NO: 3 | SEQ ID NO: 4 Xaa at position 5 is serine | SEQ ID NO: 5 Xaa at position 5 is asparagine | SEQ ID NO: 6 |
| Antibody 2 | SEQ ID NO: 1 | SEQ ID NO: 2 Xaa at position 16 is glutamine | SEQ ID NO: 3 | SEQ ID NO: 4 Xaa at position 5 is aspartic acid | SEQ ID NO: 5 Xaa at position 5 is aspartic acid | SEQ ID NO: 6 |

| Antibody | HCVR* | LCVR | HC** | LC |
|---|---|---|---|---|
| Antibody 1 | SEQ ID NO: 7 Xaa at position 65 is lysine | SEQ ID NO: 8 Xaa at position 28 is serine; Xaa at position 58 is asparagine | SEQ ID NO: 9 Xaa at position 65 is lysine | SEQ ID NO: 10 Xaa at position 28 is serine; Xaa at position 58 is asparagine |
| Antibody 2 | SEQ ID NO: 7; Xaa at position 65 is glutamine | SEQ ID NO: 8; Xaa at position 28 is aspartic acid; Xaa at position 58 is aspartic acid | SEQ ID NO: 9; Xaa at position 65 is glutamine | SEQ ID NO: 10; Xaa at position 28 is aspartic acid; Xaa at position 58 is aspartic acid |

*Xaa at position 1 is glutamic acid or pyroglutamic acid.
**Xaa at position 1 is glutamic acid or pyroglutamic acid, and Xaa at position 441 is glycine or absent.

Example: Antibody Affinity to Recombinant Human α-Synuclein Fibril

An Enzyme-Linked Immunosorbent Assay (ELISA) is performed for quantitative determination of antibody affinity to recombinant human α-synuclein fibril. Human α-synuclein fibrils are generated by shaking recombinant α-synuclein monomers continuously for two weeks before sonicating (Polinski et al, J. Parkinson's Disease 8 (2018) 303-322).

An ELISA plate is coated with recombinant human α-synuclein fibril at 1 µg/ml in PBS overnight at 4° C. The next day, the plate is incubated with 1% casein for 1 hour at room temperature to block non-specific binding sites on the plate. The plate is then washed three times with 0.1% PBST and incubated with 3× serials diluted antibody (Antibody 1, Antibody 2, or comparator antibody 1) for 1 hour at room temperature. Comparator antibody 1 ("C.A. 1") is described as an antibody having HCDRs 1-3 (Hu9E4VHv3) and LCDRs 1-3 (Hu9E4VLv3) as shown and described in U.S. Pat. No. 8,609,820 (e.g. FIG. 1 and FIG. 2). After incubation, the plate is washed three times with 0.1% PBST to remove un-bound antibody and incubated with a detection agent (1:1000 diluted goat-anti-human Kappa-AP) in 0.1% PBST for 1 hour at room temperature. The plate is washed three times with 0.1% PBST to remove un-bound detection agent and incubated with a substrate for 15 minutes at room temperature. The OD is then read in an ELISA plate reader at 560 nm. The binding curve is obtained based on the antibody concentration and OD560 readout. Antibody affinity is determined as the concentration that gives 50% of maximal binding signal ($EC_{50}$).

Following procedures essentially as described above, the following data were obtained.

TABLE 2

Binding affinity of antibodies to human α-synuclein fibril as determined by ELISA.

|  | Antibody 1 | Antibody 2 | C.A. 1 |
| --- | --- | --- | --- |
| Baseline $OD_{560}$ | 0.05464 | 0.05099 | 0.05127 |
| Maximal $OD_{560}$ | 0.9143 | 0.8881 | 0.9715 |
| $EC_{50}$ (pg/ml) | 193.30 | 160.60 | 185.60 |

These data demonstrate that the antibodies of the present invention bind human alpha-synuclein fibril with high affinity.

Example: Binding of Antibody 1 and Antibody 2 to Monomeric Alpha-Synuclein

The binding affinities of Antibody 1 and Antibody 2 to monomeric human α-synuclein (SNCA, UniProtKB P37840; SEQ ID NO: 13) is assessed. Binding affinities of Antibody 1 and Antibody 2 are also determined for various species, including human, cynomolgus monkey, rabbit, rat, and mouse alpha-synuclein.

Monomeric α-synuclein binding affinity is measured at 37° C. using a Kinetic Exclusion Assay (Kinexa) (Darling, R, and Brault, P. A. (2004) Assay Drug Dev. Technol., 2(6):647-657). The Kinexa assay is particularly physiologically relevant due to its ability to evaluate the affinity of α-synuclein in solution, in contrast to the clustered nature of α-synuclein in plate-based ELISA assays.

Separate vessels of fixed antibody concentration at 200 pM are mixed with serial dilutions of monomeric alpha-synuclein ranging from 50 μM to 847 pM. These samples are incubated for 24 to 48 hours at 37 C to allow for steady state equilibrium to be achieved. During this time, sepharose beads are conjugated with monomeric human alpha-synuclein and blocked with a suitable non-specific binding protein (typically BSA or casein). Once steady state is achieved, a small capillary is packed with coated beads and samples of each fixed antibody/alpha-synuclein monomer are injected over the column. During this step, free, unassociated antibody is captured selectively from complexed antibody, and subsequently detected via a fluorescently labeled secondary anti-human antibody. This step is repeated for each concentration of alpha-synuclein monomer and resultant fluorescent signal (proportional to percent free antibody) and then plotted as a function of fluorescent signal versus monomeric α-synuclein concentration and globally fit to a 1:1 binding model to obtain $K_D$. Independent runs (n=3) run with technical duplicates (95% confidence intervals) are reported.

In experiments conducted essentially as described above, the following data were obtained for the following species of α-synuclein: human (uniprot accession P37840), cynomolgous monkey (uniprot accession P61142), rat (uniprot accession P37377), rabbit (uniprot accession G1U0V2) and mouse (uniprot accesssion O55042).

TABLE 3

Binding affinities to monomeric alpha-synuclein as measured by Kinexa at 37° C.

| Antibody | Alpha-synuclein Species | $K_D$ (nM) | 95% CI (nM) |
| --- | --- | --- | --- |
| Antibody 1 | Human | 19 | 12.2 to 28.5 |
|  | Cynomolgus Monkey | 19.9 | 13.4 to 25.8 |
|  | Rabbit | 553.9 | 267.6 to 1080 |
|  | Rat | 89 | 60.3 to 127.3 |
|  | Mouse | 49.7 | 31.6 to 76.1 |
| Antibody 2 | Human | 65.6 | 48.1 to 82.1 |
|  | Cynomolgus Monkey | 34.3 | 27.3 to 42.4 |
|  | Rabbit | 1020 | 677.5 to 1500 |
|  | Rat | 140.5 | 109.9 to 176.4 |
|  | Mouse | 99.3 | 67.2 to 134.9 |

These data demonstrate that Antibody 1 and Antibody 2 bind human, cynomolgus monkey, rat, and mouse alpha-synuclein, and to a lesser extent, rabbit alpha-synuclein.

Example: Binding of Antibody 1 and Antibody 2 to Dimeric Alpha-Synuclein

The binding affinities of Antibody 1 and Antibody 2 to an avidity-surrogate dimeric presentation of a C-terminal fragment of human α-synuclein containing residues 100-140 on a mouse Fc (mIgG1-hAsyn100-140) are assessed. Binding affinities are determined using a plate-capture method based on the principles of Kinexa, called MSD-SET (Estrep, et al. (2013) MAbs, 5(2): 270-278). A synthetic dimeric presentation of human alpha-synuclein comprising the last 40 amino acids of SEQ ID NO: 13 fused onto the C-terminal end of a mouse Fc fragment, separated by a short unstructured linker element is engineered (mIgG1-hAsyn100-140). This synthetic surrogate molecule provides a relatively stable and homogeneous presentation of an avidity-competent human α-synuclein aggregate surrogate for biochemical characterization efforts.

Antibody (100 fM) is mixed with increasing concentrations of mIgG1-hAsyn100-140 ranging from 3.67 fM to 7.69 nM in a two-fold dilution series and allowed to achieve steady state equilibrium at either 25° C. or 37° C. During this incubation time, an MSD Sector plate is coated with monomeric human alpha-synuclein and blocked with a blocking reagent (i.e. BSA, casein). Following steady state equilibrium incubation times, individual antibody/mIgG1-hAsyn 100-140 mixtures are added simultaneously to the plate and allowed to incubate for 10 minutes to capture free antibody and minimize exchange with antibody in complex with mIgG1-hAsyn100-140. Following this short incubation, plates are subsequently washed and incubated with a biotinylated anti-human secondary antibody, followed by detection using streptavidin-S-tag on the MSD instrument. The resultant MSD signal (proportional to % free antibody) is then plotted as a function of mIgG1-hAsyn100-140 concentration and globally fit to a four parameter fit to obtain $IC_{50}$ ($K_D$). Reported 95% confidence intervals represent the fitting of N=3 independent runs each with technical duplicates. The avidity-factor is the ratiometric difference between monomer affinity and dimer affinity and represents the selectivity in binding between monomeric and dimeric α-synuclein for antibody. Affinity values are reported in Table 4.

TABLE 4

Binding affinities of dimeric human alpha-synuclein at 25° C. and 37° C.

| Test Article | 25° C. | | 37° C. | |
| --- | --- | --- | --- | --- |
| | $K_D$ (pM) | 95% CI (pM) | $K_D$ (pM) | 95% CI (pM) |
| Antibody 1 | 0.12 | 0.11 to 0.14 | 0.97 | 0.85 to 1.11 |
| Antibody 2 | 3.2 | 2.4 to 4.2 | Not tested | Not tested |
| C.A. 1 | 1.5 | 1.1 to 2.1 | 6.5 | 5.5 to 7.7 |

As shown in Table 4, the 25° C. data demonstrated higher affinity of Antibody 1 relative to Antibody 2 and C.A. 1 for dimeric α-synuclein. At 37° C., the affinity of Antibody 1 is 6.7-fold higher (on average) relative to C.A. 1 for dimeric α-synuclein. The 37° C. data for Antibody 1 indicate that the avidity factor (selectivity indicator) between the monomeric human α-synuclein ($K_D$ 19 nM, see Table 3) and the dimeric human α-synuclein (aggregate surrogate; $K_D$ 0.97 pM, see Table 4) is approximately 20,000-fold.

Example: In Vitro Quantification of Human α-Synuclein Fibril Uptake into SH-SYSY Cells To investigate the mechanism by which Antibody 1 inhibits human α-synuclein aggregate formation, the ability of Antibody 1 to block internalization (uptake) of α-synuclein fibrils is determined.

Human α-synuclein fibrils are generated by shaking recombinant α-synuclein monomers (labelled with amine reactive pH-sensitive dye pHAb (Promega, G9841)) continuously for two weeks before sonicating (Polinski et al, J. Parkinson's Disease 8 (2018) 303-322). The pHAb-dye labelled human α-synuclein fibrils (2 μg/ml) are added to serially diluted antibodies ranging from 100 μg/ml to 0.097 μg/ml. This mixture is then added to an average 25,000 SH-SYSY cells/well and incubated overnight at 37° C.

The next day, the cells are washed, incubated with NucBlue Hoechst dye (Thermo Fisher, R37605) for 20 minutes, washed again, and then imaged by high content imaging on a Cytation 5 instrument (BioTek). pHAb dye fluoresces only at acidic pH (i.e. when dye enters into the endocytic/lysosomal pathway upon internalization). Therefore, to calculate internalization intensity per cell, the total fluorescent intensity from the pHAb dye is divided by the number of nuclei per well. At least 20,000 cells are counted per data point in duplicate. The intensity of cellular fluorescence correlates with the internalization of human α-synuclein fibrils, allowing for a live-cell, and quantitative readout of pHAb-labeled human α-synuclein uptake.

Following procedures essentially as described above, the following data were obtained.

TABLE 5

Inhibition of fibril internalization following treatment with antibodies.

| Antibody/ Test Article | Average $IC_{50}$ (μg/mL) | $IC_{50}$ Standard Deviation (μg/mL) |
| --- | --- | --- |
| Antibody 1 | 0.45 | 0.017 |
| Antibody 2 | 0.56 | 0.026 |
| C.A. 1 | 0.44 | N/A |

As shown in Table 5, Antibody 1 inhibited human α-synuclein fibril internalization with an average $IC_{50}$ of 0.45 μg/ml. Antibody 2 inhibited human α-synuclein fibril internalization with an average $IC_{50}$ of 0.56 μg/ml. In a similar study, C.A. 1 had an $IC_{50}$ of 0.44 μg/ml and control hIgG1 antibody had no effect on pHAb-labeled human α-synuclein fibril internalization. These data demonstrate that the tested antibodies are able to inhibit α-synuclein uptake.

Example: In Vitro Assessment of Antibody 1 Inhibition of Human α-Synuclein Mediated Aggregation in SHSY-5Y-A53T-myc Cells A53T is a naturally occurring variant of α-synuclein that is found in certain individuals with a strong pre-disposition to early onset PD. Several studies have shown that A53T imparts a more rapid aggregation phenotype to human α-synuclein. Inhibition of human α-synuclein aggregate formation is determined using human SH-SY5Y-A53T-myc expressing cells that are tetracycline inducible to overexpress the mutant A53T form of human α-synuclein.

To measure human α-synuclein aggregation, the SH-SY5Y-A53T-myc cells are plated into black CellBIND plates (Corning) at 40,000 cells per well in growth medium plus 1 μg/ml tetracycline. The following day, the media is removed and replaced with fresh media containing an eight-point dilution curve of anti-α-synuclein antibody ranging from 60 μg/ml to 0.027 μg/ml with a fixed concentration of 3 μg/ml sonicated human α-synuclein pre-formed fibrils (PFFs) and 1 μg/ml tetracycline. Tetracycline alone and PFF alone are included as aggregation controls. There are three technical replicates for each concentration in the dilution series.

The plates are incubated for five days at 37° C., 95% humidity and then fixed with 1× Prefer fixative (Anatech) for one hour. The plates are washed twice with 1×DPBS and once with Tris Buffered Saline+Tween-20 (TBST). The cells are blocked in 5% milk (Difco) in TBST for one hour and immunostained with the primary antibodies mouse anti-pS129 at 1 μg/ml and sheep anti-myc (Fisher, PA3-981) at 1:1000 dilution in 5% milk/TBST overnight at 4° C.

The plates are then washed three times with TBST, and then incubated for >2 hours at room temperature with secondary antibodies goat anti-mouse AlexaFluor647 (Invitrogen, A32728) and donkey anti-sheep AlexaFluor555 (Invitrogen, A21436), each diluted 1:1000 in TBST. The plates are washed twice with TBST, then twice with DPBS, and then sealed. The plates are loaded onto the Insight Instrument for high content imaging and analysis using the Spot Detector v4.0 algorithm. Data generated by the algorithm is processed for $IC_{50}$ calculation with Graph Pad Prism software v7.0.

In experiments performed essentially as described above, the following data were obtained.

TABLE 6

Inhibition of alpha-synuclein aggregation in SHSY-5Y-A53T-myc cells following treatment with antibodies.

| Antibody/<br>Test Article | Average $IC_{50}$<br>(µg/mL) | $IC_{50}$ Std<br>Dev (µg/mL) |
|---|---|---|
| Antibody 1 | 0.41 | 0.06 |
| Antibody 2 | 0.40 | 0.15 |
| C.A. 1 | 0.38 | 0.13 |

These data demonstrate that the antibodies of the present invention are able to inhibit alpha-synuclein aggregation in SHSY-5Y-A53T-myc cells. Compared to the pHAb internalization inhibition data shown in Table 5, there is an overlap of the CRC curves with very similar $IC_{50}$ values ($IC_{50}$ 0.45 µg/ml in Table 5 compared to 0.41 µg/ml in Table 6). These results suggest that inhibition of human α-synuclein fibril-induced aggregation and seeding by Antibody 1 may be caused directly by inhibiting the internalization of human α-synuclein fibrils into cells.

Example: In Vitro Assessment of Antibody 1 and C.A. 1 Inhibition of pHAb Labeled 1-121 and 1-140 α-Synuclein Fibril Uptake on SHSY-5Y-A53T-Myc Cells pHAb labelled α-synuclein fibrils of 1-121 (amino acids 1-121 of SEQ ID NO: 13) and 1-140 (SEQ ID NO: 13) in length are generated. Alpha-synuclein monomers are labelled with pHAb dye, buffer exchanged, and then shaken for two weeks at 1400 RPM. At the end of two weeks, the fibrils are sonicated for 120 seconds before experimentation.

Antibody 1 and C.A. 1 are serially diluted from 100 µg/mL to 0.1 µg/mL. Antibodies are combined with the pHAb-labelled α-synuclein 1-121 fragment and full-length alpha-synuclein at 2 µg/mL. This solution is then applied to SHSYSY cells and incubated overnight. The cells are then imaged on Cytation 5, threshold 2000.

Figure 1B:
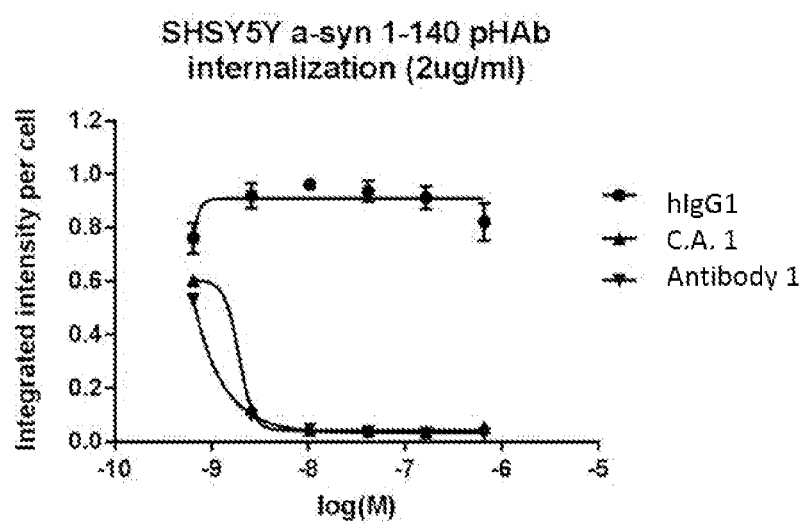
FIG. 1b. Inhibition of alpha-synuclein internalization.
Figure 2:
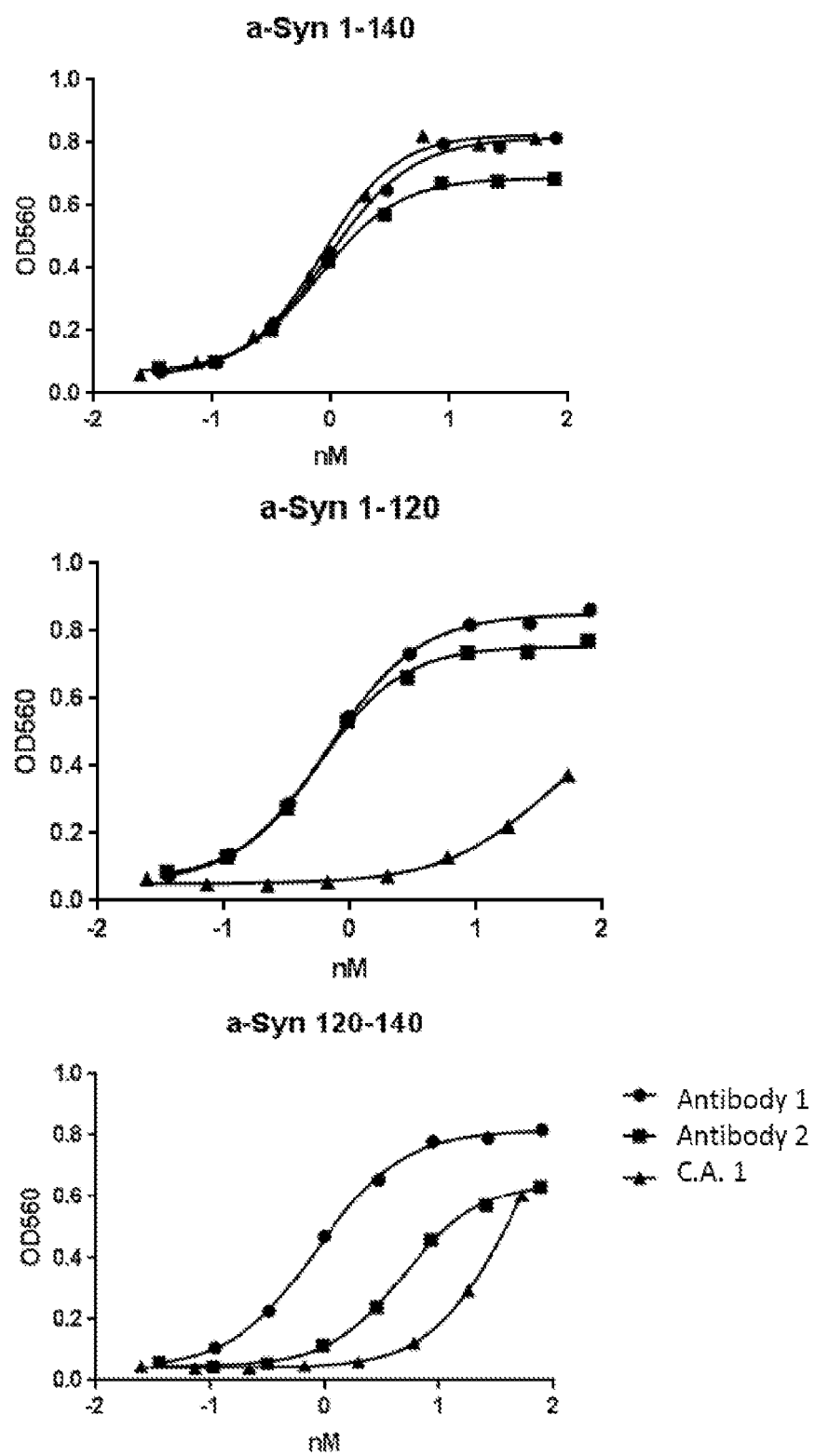
FIG. 2. Binding of antibody to full-length and alpha-synuclein fragments.

Based on procedures essentially as described above, the results demonstrated uptake of 1-121 α-synuclein and full-length α-synuclein pHAb fibrils. Antibody 1 blocked the uptake of 1-121 α-synuclein fibrils while C.A. 1 showed minimal, if any, effect on uptake of 1-121 α-synuclein fibrils (FIG. 1a). Antibody 1 and C.A. 1 showed similar activity in the inhibition of full-length α-synuclein uptake (FIG. 1b).

These data demonstrate that Antibody 1 and C.A. 1 have different effects on blocking α-synuclein fibril internalization. Antibody 1 was able to dose-dependently block cellular uptake with both full-length and 1-121 fibrils, while C.A. 1 was only able to block the 1-140 fibrils. This suggests Antibody 1 will be more efficacious by its ability to bind and block internalization of fragmented alpha-synuclein.

Example: Epitope Determination of Antibody 1 and Antibody 2

Biochemical Determination of the Epitope

The epitopes of Antibody 1 and Antibody 2 are determined by peptide alanine scanning. Binding is measured by biolayer interferometry on an OctetRed384 (ForteBio). Streptavidin biosensors (ForteBio) are loaded with each of the biotinylated alanine-mutation peptides of human α-synuclein residues 110-133 of SEQ ID NO: 13 in 0.1% BSA, 0.05% PBST assay buffer, washed in the same buffer, and then transferred to wells containing antibody solutions at a concentration of 15 µg/mL. The response signal and dissociation rate are obtained with a 1:1 fitting model using Octet software. The loss of response signal or change of dissociation rate ($K_{off}$) to the alanine-mutation peptides compared to the wild type peptide indicates the epitope residues.

In experiments performed following procedures essentially as described above, the key residues for Antibody 1 and Antibody 2 are determined to be in two separate regions—D115, M116 and D119, and E126 and P128. A similar experiment was performed with C.A. 1. The epitope residues of C.A. 1 were determined to be N122 and Y125, which corresponds to the reported epitope in U.S. Pat. No. 10,081,674 (see e.g. FIG. 6).

Binding to Two Independent Epitopes

Because the key epitope residues are in two regions (as described above), to understand whether Antibody 1 and Antibody 2 can bind to the two regions independently, an ELISA is performed using truncated human α-synuclein fragment 1-120 (residues 1-120 of SEQ ID NO: 13) and biotinylated human α-synuclein peptide 120-140 (residues 120-140 of SEQ ID NO: 13). Binding full-length (1-140) α-synuclein is also determined. The procedure is essentially as described above for α-synuclein fibril binding. Following procedures essentially as described above, the binding curves are shown in FIG. 2.

These data demonstrate that Antibody 1 and Antibody 2 bind to both α-synuclein fragments 1-120 and 120-140 with binding affinities in the picomolar range. Antibody 1 has similar affinity for each of the two α-synuclein fragments. Antibody 2 has a similar affinity as Antibody 1 for α-synuclein fragment 1-120, but has a weaker affinity for α-synuclein fragment 120-140. The result showed lack of well-defined upper and lower asymptotes for C.A. 1 for both α-synuclein fragments. Antibody 1, Antibody 2, and C.A. 1 bind α-synuclein monomer (1-140) with similar affinities. These data suggest that Antibody 1 and Antibody 2 can bind both cleaved and full-length alpha-synuclein.

Alpha-Synuclein Fragment Analysis

To determine if Antibody 1 binding is impacted by calpain I and caspase cleavage (residues 122/123 and 121/122, respectively) of α-synuclein that has been reported to be upregulated in Parkinson's Disease (Duffy et al, (2007) Am. J. Pathol. 170(5): 1725-1738 and Wang et al, (2016) Proc. Nat. Acad. Sci. 113(34): 9587-9592), binding of Antibody 1 to progressive C-terminal truncations of monomeric human α-synuclein are assessed using the same Kinexa methods and procedures previously described for full length monomeric human alpha-synuclein above. Alpha-synuclein fragments tested are amino acids 1-140, 1-121, and 1-115 of SEQ ID NO: 13.

Following procedures essentially as described above, the following data were obtained.

TABLE 7

Binding affinities of Antibody 1 and C.A. 1 for progressive c-terminal truncations of monomeric human alpha-synuclein as determined by Kinexa at 37° C.

| Alpha-synuclein<br>fragment | Antibody 1 | | C.A. 1 | |
|---|---|---|---|---|
| | $K_D$ (nM) | 95% CI (nM) | $K_D$ (nM) | 95% CI (nM) |
| 1-140 | 19 | 12.2 to 28.5 | 87.2 | 60.7 to 105.9 |
| 1-121 | 11.8 | 7.9 to 16.0 | >20,000 | Not calculated |
| 1-115 | 675 | 418.4 to 1060 | Not measured | Not measured |

These data suggest that binding of Antibody 1 to α-synuclein is unaffected by the calpain and caspase cleaved species of human α-synuclein that have been observed in Parkinson's patients while C.A. 1 is unable to engage with these fragmented species.

Example: In Vivo Efficacy

To evaluate the pharmacological efficacy of an antibody of the present invention in vivo, both a neutralization and peripheral chronic study are performed in the seeded A53T mouse model.

For the neutralization study, recombinant α-synuclein fibril is premixed with an antibody of the present invention or C.A. 1 in near molar equivalents (antibody in slight molar excess), allowed to complex for 30 minutes ex vivo, and then the mixture is injected into a mouse. Animals are euthanized 90 days post-infusion.

The peripheral chronic study examines the efficacy of antibody when chronically dosed via an intraperitoneal injection. Briefly, recombinant α-synuclein fibril is infused into the brain and an antibody of the present invention or C.A. 1 is injected 16-hours post-fibril infusion. Antibody is administered bi-weekly for a total of 120 days.

In both studies, pharmacological efficacy of the antibody is assessed biochemically and by immunohistochemistry by quantifying changes in the development of α-synuclein pathology. The biochemistry monitors oligomeric α-synuclein extracted from tissues from the SDS insoluble fraction as well as phospho129 modified (P129; α-synuclein phosphorylated at serine 129), which is a well-accepted marker for Lewy Body formation. Immunohistochemistry studies evaluate P129 staining burden in these mice. PK parameters for drug concentrations in serum and CSF at the end of the study are also collected to understand steady state levels of compound.

Treatment with the antibodies of the present invention may result in reduced oligomeric alpha-synuclein and reduced P129 staining.

```
                             SEQUENCES

Antibody 1 and Antibody 2 HCDR1 (SEQ ID NO: 1)
AASGFTFSSYAMS

Antibody 1 and Antibody 2 HCDR2 (SEQ ID NO: 2)
AISGSGGDTYYADSVXG
wherein Xaa at position 16 is lysine or glutamine.

Antibody 1 and Antibody 2 HCDR3 (SEQ ID NO: 3)
ARGYGMDV

Antibody 1 and Antibody 2 LCDR1 (SEQ ID NO: 4)
RSSQXLVHSDGNTYLM
wherein Xaa at position 5 is serine or aspartic acid.

Antibody 1 and Antibody 2 LCDR2 (SEQ ID NO: 5)
YKVSXRNS
wherein Xaa at position 5 is asparagine or aspartic acid.

Antibody 1 and Antibody 2 LCDR3 (SEQ ID NO: 6)
MQGTKQYPT

Antibody 1 and Antibody 2 HCVR (SEQ ID NO: 7)
XVQLLESGGGLVQPGGSLRLSCAASGFTFSSYAMSWVRQAPGKGLEWVSAISGSGGDTYYADSVXGRFTISRDNSKNTLYLQ
MNSLRAEDTAVYYCARGYGMDVWGQGTTVTVSS
wherein Xaa at position 1 is glutamic acid or pyroglutamic acid, and wherein Xaa
at position 65 is lysine or glutamine.

Antibody 1 and Antibody 2 LCVR (SEQ ID NO: 8)
DVVMTQSPLSLPVTLGQPASISCRSSQXLVHSDGNTYLMWFQQRPGQSPRRLIYKVSXRNSGVPDRFSGSGSGTDFTLKISR
VEAEDVGVYYCMQGTKQYPTFGQGTKLEIK
wherein Xaa at position 28 is serine or aspartic acid, and wherein Xaa at position
58 is asparagine or aspartic acid.

Antibody 1 and Antibody 2 HC (SEQ ID NO: 9)
XVQLLESGGGLVQPGGSLRLSCAASGFTFSSYAMSWVRQAPGKGLEWVSAISGSGGDTYYADSVXGRFTISRDNSKNTLYLQ
MNSLRAEDTAVYYCARGYGMDVWGQGTTVTVSSASTKGPSVFPLAPCSRSTSESTAALGCLVKDYFPEPVTVSWNSGALTSG
VHTFPAVLQSSGLYSLSSVVTVPSSSLGTKTYTCNVDHKPSNTKVDKRVESKYGPPCPPCPAPEAAGGPSVFLFPPKPKDTL
MISRTPEVTCVVVDVSQEDPEVQFNWYVDGVEVHNAKTKPREEQFNSTYRVVSVLTVLHQDWLNGKEYKCKVSNKGLPSSIE
KTISKAKGQPREPQVYTLPPSQEEMTKNQVSLTCLVKGFYPSDIAVEWESNGQPENNYKTTPPVLDSDGSFFLYSRLTVDKS
RWQEGNVFSCSVMHEALHNHYTQKSLSLSLX
wherein Xaa at position 1 is glutamic acid or pyroglutamic acid, wherein Xaa at
position 65 is lysine or glutamine, and wherein Xaa at position 441 is glycine or
absent.

Antibody 1 and Antibody 2 LC (SEQ ID NO: 10)
DVVMTQSPLSLPVTLGQPASISCRSSQXLVHSDGNTYLMWFQQRPGQSPRRLIYKVSXRNSGVPDRFSGSGSGTDFTLKISR
VEAEDVGVYYCMQGTKQYPTFGQGTKLEIKRTVAAPSVFIFPPSDEQLKSGTASVVCLLNNFYPREAKVQWKVDNALQSGNS
QESVTEQDSKDSTYSLSSTLTLSKADYEKHKVYACEVTHQGLSSPVTKSFNRGEC
wherein Xaa at position 28 is serine or aspartic acid, and wherein Xaa at position
58 is asparagine or aspartic acid.

DNA encoding Antibody 1 HC (SEQ ID NO: 11)
GAGGTGCAGCTGTTGGAGTCTGGGGGAGGCTTGGTACAGCCTGGGGGGTCCCTGAGACTCTCCTGTGCAGCCTCTGGATTCA
CCTTTAGCAGCTATGCCATGAGCTGGGTCCGCCAGGCTCCAGGGAAGGGGCTGGAGTGGGTCTCAGCTATTAGTGGTAGTGG
TGGCGACACATACTACGCAGACTCCGTGAAGGGCCGGTTCACCATCTCCAGAGACAATTCCAAGAACACGCTGTATCTGCAA
ATGAACAGCCTGAGAGCCGAGGACACGGCCGTATATTACTGTGCGAGGGGCTACGGTATGGACGTCTGGGGCCAAGGGACCA
CGGTCACCGTCTCCTCAGCCTCCACCAAGGGCCCATCGGTCTTCCCGCTAGCGCCCTGCTCCAGGAGCACCTCCGAGAGCAC
```

SEQUENCES

AGCCGCCCTGGGCTGCCTGGTCAAGGACTACTTCCCCGAACCGGTGACGGTGTCGTGGAACTCAGGCGCCCTGACCAGCGGC
GTGCACACCTTCCCGGCTGTCCTACAGTCCTCAGGACTCTACTCCCTCAGCAGCGTGGTGACCGTGCCCTCCAGCAGCTTGG
GCACGAAGACCTACACCTGCAACGTAGATCACAAGCCCAGCAACACCAAGGTGGACAAGAGAGTTGAGTCCAAATATGGTCC
CCCATGCCCACCCTGCCCAGCACCTGAGGCCGCCGGGGGACCATCAGTCTTCCTGTTCCCCCCAAAACCCAAGGACACTCTC
ATGATCTCCCGGACCCCTGAGGTCACGTGCGTGGTGGTGGACGTGAGCCAGGAAGACCCCGAGGTCCAGTTCAACTGGTACG
TGGATGGCGTGGAGGTGCATAATGCCAAGACAAAGCCGCGGGAGGAGCAGTTCAACAGCACGTACCGTGTGGTCAGCGTCCT
CACCGTCCTGCACCAGGACTGGCTGAACGGCAAGGAGTACAAGTGCAAGGTCTCCAACAAAGGCCTCCCGTCCTCCATCGAG
AAAACCATCTCCAAAGCCAAAGGGCAGCCCCGAGAGCCACAGGTGTACACCCTGCCCCCATCCCAGGAGGAGATGACCAAGA
ACCAGGTCAGCCTGACCTGCCTGGTCAAAGGCTTCTACCCCAGCGACATCGCCGTGGAGTGGGAAAGCAATGGGCAGCCGGA
GAACAACTACAAGACCACGCCTCCCGTGCTGGACTCCGACGGCTCCTTCTTCCTCTACAGCAGGCTAACCGTGGACAAGAGC
AGGTGGCAGGAGGGGAATGTCTTCTCATGCTCCGTGATGCATGAGGCTCTGCACAACCACTACACACAGAAGAGCCTCTCCC
TGTCTCTGGGT

DNA encoding Antibody 1 LC (SEQ ID NO: 12)
GATGTTGTGATGACTCAGTCTCCACTCTCCCTGCCCGTCACCCTTGGACAGCCGGCCTCCATCTCCTGCAGGTCTAGTCAAA
GCCTCGTACACAGTGATGGAAACACCTACTTGATGTGGTTTCAGCAGAGGCCAGGTCAATCTCCAAGGCGCCTAATTTATAA
GGTTTCTAACCGGAACTCTGGGGTCCCAGACAGATTCAGCGGCAGTGGGTCAGGCACTGATTTCACACTGAAAATCAGCAGG
GTGGAGGCTGAGGATGTTGGGGTTTATTACTGCATGCAAGGTACAAAGCAGTACCCCACTTTTGGCCAAGGGACCAAGCTGG
AGATCAAACGGACCGTGGCTGCACCATCTGTCTTCATCTTCCCGCCATCTGATGAGCAGTTGAAATCTGGAACTGCCTCTGT
TGTGTGCCTGCTGAATAACTTCTATCCCAGAGAGGCCAAAGTACAGTGGAAGGTGGATAACGCCCTCCAATCGGGTAACTCC
CAGGAGAGTGTCACAGAGCAGGACAGCAAGGACAGCACCTACAGCCTCAGCAGCACCCTGACGCTGAGCAAAGCAGACTACG
AGAAACACAAAGTCTACGCCTGCGAAGTCACCCATCAGGGCCTGAGCTCGCCCGTCACAAAGAGCTTCAACAGGGGAGAGTG
C Human alpha-synuclein (SEQ ID NO: 13)
MDVFMKGLSKAKEGVVAAAEKTKQGVAEAAGKTKEGVLYVGSKTKEGVVHGVATVAEKTKEQVTNVGGAVVTGVTAVAQKTV
EGAGSIAAATGFVKKDQLGKNEEGAPQEGILEDMPVDPDNEAYEMPSEEGYQDYEPEA

We claim:

1. An anti-alpha-synuclein antibody comprising a heavy chain (HC) and a light chain (LC), wherein the HC comprises a heavy chain variable region (HCVR) and the LC comprises a light chain variable region (LCVR), and wherein the HCVR comprises a HCDR1, HCDR2, and HCDR3, and the LCVR comprises a LCDR1, LCDR2, and LCDR3, wherein the amino acid sequence of the HCDR1 comprises SEQ ID NO:1, the amino acid sequence of the HCDR2 comprises SEQ ID NO: 2, the amino acid sequence of the HCDR3 comprises SEQ ID NO: 3, the amino acid sequence of the LCDR1 comprises SEQ ID NO: 4, the amino acid sequence of the LCDR2 comprises SEQ ID NO: 5, and the amino acid sequence of the LCDR3 comprises SEQ ID NO: 6, and wherein Xaa at position 16 of SEQ ID NO: 2 is lysine, Xaa at position 5 of SEQ ID NO: 4 is serine, and Xaa at position 5 of SEQ ID NO: 5 is asparagine, or wherein Xaa at position 16 of SEQ ID NO: 2 is glutamine, Xaa at position 5 of SEQ ID NO: 4 is aspartic acid, and Xaa at position 5 of SEQ ID NO: 5 is aspartic acid.

2. The antibody of claim 1, wherein Xaa at position 16 of SEQ ID NO: 2 is lysine, Xaa at position 5 of SEQ ID NO: 4 is serine, and Xaa at position 5 of SEQ ID NO: 5 is asparagine.

3. The antibody of claim 1, wherein Xaa at position 16 of SEQ ID NO: 2 is glutamine, Xaa at position 5 of SEQ ID NO: 4 is aspartic acid, and Xaa at position 5 of SEQ ID NO: 5 is aspartic acid.

4. The antibody of claim 1, wherein the amino acid sequence of the HCVR comprises SEQ ID NO: 7 wherein Xaa at position 1 is glutamic acid or pyroglutamic acid, and the amino acid sequence of the LCVR comprises SEQ ID NO: 8, and wherein Xaa at position 65 of SEQ ID NO: 7 is lysine, Xaa at position 28 of SEQ ID NO: 8 is serine, and Xaa at position 58 of SEQ ID NO: 8 is asparagine, or wherein Xaa at position 65 of SEQ ID NO: 7 is glutamine, Xaa at position 28 of SEQ ID NO: 8 is aspartic acid, and Xaa at position 58 of SEQ ID NO: 8 is aspartic acid.

5. The antibody of claim 4, wherein Xaa at position 1 of SEQ ID NO: 7 is glutamic acid, Xaa at position 65 of SEQ ID NO: 7 is lysine, Xaa at position 28 of SEQ ID NO: 8 is serine, and Xaa at position 58 of SEQ ID NO: 8 is asparagine.

6. The antibody of claim 4, wherein Xaa at position 1 of SEQ ID NO: 7 is glutamic acid, Xaa at position 65 of SEQ ID NO: 7 is glutamine, Xaa at position 28 of SEQ ID NO: 8 is aspartic acid, and Xaa at position 58 of SEQ ID NO: 8 is aspartic acid.

7. The antibody of claim 1, wherein the amino acid sequence of the HC comprises SEQ ID NO: 9 and the amino acid sequence of the LC comprises SEQ ID NO: 10; and wherein:

a) the amino acid sequence of SEQ ID NO: 9 is XVQLLESGGGLVQPGGSLRLSCAASGFTFSSY AMSWVRQAPGKGLEWVSAISGS GGDTYYAD SVXGRFTISRDNSKNTLYLQMNSLRAEDTAVYY-CARGYGMDVWG QGTTVTVSSASTKGPSVFPL APCSRSTSESTAALGCLVKDYFPEPVTVSWNS-GAL TSGVHTFPAVLQSSGLYSLSSVVTVPSS SL GTK TYTCNVDHKPSNTKVDKRVESK YGPPCPP CPAPEAAGGPSVFLFPPKPKDTLMISRTPEVTCV VVDVSQEDPEVQFN WYVDGVEVHNAKTKPRE-EQFNSTYRVVSVLTVLHQDWLNGKEYKC KVSNKGL PSSIEKTISKAKGQPREPQVYTLPPSQ EEMTKNQVSLTCLVKGFYPSDIAVEWESN GQPE NNYKTTPPVLDSDGSFFLYSRLTVDKSRWQ EGNVFSCSVMHEALHNHYT QKSLSLSLX, wherein Xaa at position 1 is glutamic acid or pyroglutamic acid, wherein Xaa at position 65 is lysine or glutamine, and wherein Xaa at position 441 is glycine or absent; and b) the amino acid sequence of SEQ ID NO: 10 is DVVMTQSPLSLPVTLGQPASISCRSSQXLVH SD GNTYLMWFQQRPGQSPRRLIYK VSXRNSGVPD RFSGSGSGTDFTLKISRVEAEDVGVYYCMQ GT KQYPTFGQGTKL EIKRTVAAPSVFIFPPSDEQ LK SGTASVVCLLNNFYPREAKVQWKVDNALQS GNS QESVTEQDSKDSTYSLSSTLTLSKADYEK HKVYACEVTHQGLSSPVTKSFNRGEC, and wherein Xaa at position 28 is serine and Xaa at position 58 is asparagine, or wherein Xaa at position 28 is aspartic acid and Xaa at position 58 is aspartic acid.

8. The antibody of claim 7, wherein Xaa at position 1 of SEQ ID NO: 9 is glutamic acid, Xaa at position 65 of SEQ ID NO: 9 is lysine, Xaa at position 441 of SEQ ID NO: 9 is glycine, Xaa at position 28 of SEQ ID NO: 10 is serine, and Xaa at position 58 of SEQ ID NO: 10 is asparagine.

9. The antibody of claim 7, wherein Xaa at position 1 of SEQ ID NO: 9 is glutamic acid, Xaa at position 65 of SEQ ID NO: 9 is glutamine, Xaa at position 441 of SEQ ID NO: 9 is glycine, Xaa at position 28 of SEQ ID NO: 10 is aspartic acid, and Xaa at position 58 of SEQ ID NO: 10 is aspartic acid.

10. The alpha-synuclein antibody of claim 1, wherein the alpha-synuclein antibody binds human alpha-synuclein at residues aspartic acid at position 115, methionine at position 116, aspartic acid at position 119, glutamic acid at position 126, and proline at position 128 of SEQ ID NO: 13.

11. The antibody of claim 1, wherein the antibody binds an alpha-synuclein fragment comprising residues 1-120 of SEQ ID NO: 13.

12. The antibody of claim 1, wherein the antibody binds an alpha-synuclein fragment comprising residues 120-140 of SEQ ID NO: 13.

13. A pharmaceutical composition comprising the antibody of claim 1, and one or more pharmaceutically acceptable carriers, diluents, or excipients.

14. A method of treating a patient with a synucleinopathy, comprising administering to the patient an effective amount of the antibody of claim 1.

15. The method of claim 14, wherein the synucleinopathy is Parkinson's disease (PD), Multiple System Atrophy (MSA), or Alzheimer's disease (AD).

16. The method of claim 14, wherein the synucleinopathy is Dementia with Lewy Bodies (DLB).

17. The method of claim 14, wherein the synucleinopathy is Parkinson's disease.

18. A DNA molecule of the antibody of claim 1 comprising a polynucleotide that encodes the antibody HC comprises the amino acid sequence of SEQ ID NO: 9 and a polynucleotide that encodes the antibody LC comprises the amino acid sequence of SEQ ID NO: 10.

19. The DNA molecule of claim 18, wherein the sequence of the polynucleotide that encodes the HC comprises SEQ ID NO: 11.

20. The DNA molecule of claim 18, wherein the sequence of the polynucleotide that encodes the LC comprises SEQ ID NO: 12.

21. A DNA molecule of claim 7 comprising a polynucleotide that encodes the HC comprises the amino acid sequence of SEQ ID NO: 9 and a polynucleotide that encodes the LC comprises the amino acid sequence of SEQ ID NO:10.

22. The DNA molecule of claim 21, wherein the sequence of the polynucleotide that encodes the HC comprises SEQ ID NO: 11, and the sequence of the polynucleotide that encodes the LC comprises SEQ ID NO: 12.

23. A mammalian cell transformed with a DNA molecule of the antibody of claim 1 that encodes the antibody HC comprises the amino acid sequence of SEQ ID NO: 9 and a DNA molecule that encodes the antibody LC comprises the amino acid sequence of SEQ ID NO: 10, wherein transformed mammalian express an antibody comprising two HCs and two LCs, in which the amino acid sequence of each HC comprises SEQ ID NO: 9, and the amino acid sequence of each LC comprises SEQ ID NO: 10.

24. A mammalian cell transformed with the DNA molecule of claim 21, wherein transformed mammalian cell express an antibody comprising two HCs and two LCs, in which the amino acid sequence of each HC comprises SEQ ID NO: 9, and the amino acid sequence of each LC comprises SEQ ID NO: 10.

25. A process for producing an antibody, wherein the antibody comprises two HCs and two LCs, wherein the amino acid sequence of each HC comprises SEQ ID NO: 9 and the amino acid sequence of each LC comprises SEQ ID NO: 10, and wherein the process comprises:
 a) cultivating the mammalian cell of claim 23 under conditions that express the antibody, and
 b) recovering the expressed antibody.

* * * * *

SEQUENCE LISTING

<160> NUMBER OF SEQ ID NOS: 13

<210> SEQ ID NO 1
<211> LENGTH: 13
<212> TYPE: PRT
<213> ORGANISM: Artificial Sequence
<220> FEATURE:
<223> OTHER INFORMATION: Synthetic Construct

<400> SEQUENCE: 1

Ala Ala Ser Gly Phe Thr Phe Ser Ser Tyr Ala Met Ser
1               5                   10

<210> SEQ ID NO 2
<211> LENGTH: 17
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (16)..(16)
<223> OTHER INFORMATION: Xaa at position 16 is lysine or glutamine.

<400> SEQUENCE: 2

Ala Ile Ser Gly Ser Gly Gly Asp Thr Tyr Tyr Ala Asp Ser Val Xaa
1               5                   10                  15

Gly

<210> SEQ ID NO 3
<211> LENGTH: 8
<212> TYPE: PRT
<213> ORGANISM: Artificial Sequence
<220> FEATURE:
<223> OTHER INFORMATION: Synthetic Construct

<400> SEQUENCE: 3

```
Ala Arg Gly Tyr Gly Met Asp Val
1               5
```

<210> SEQ ID NO 4
<211> LENGTH: 16
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (5)..(5)
<223> OTHER INFORMATION: Xaa at position 5 is serine or aspartic acid.

<400> SEQUENCE: 4

```
Arg Ser Ser Gln Xaa Leu Val His Ser Asp Gly Asn Thr Tyr Leu Met
1               5                   10                  15
```

<210> SEQ ID NO 5
<211> LENGTH: 8
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (5)..(5)
<223> OTHER INFORMATION: Xaa at position 5 is asparagine or aspartic
      acid.

<400> SEQUENCE: 5

```
Tyr Lys Val Ser Xaa Arg Asn Ser
1               5
```

<210> SEQ ID NO 6
<211> LENGTH: 9
<212> TYPE: PRT
<213> ORGANISM: Artificial Sequence
<220> FEATURE:
<223> OTHER INFORMATION: Synthetic Construct

<400> SEQUENCE: 6

```
Met Gln Gly Thr Lys Gln Tyr Pro Thr
1               5
```

<210> SEQ ID NO 7
<211> LENGTH: 115
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (1)..(1)
<223> OTHER INFORMATION: Xaa at position 1 is glutamic acid or
      pyroglutamic acid.
<220> FEATURE:
<221> NAME/KEY: MISC_FEATURE
<222> LOCATION: (65)..(65)
<223> OTHER INFORMATION: Xaa at position 65 is lysine or glutamine.

<400> SEQUENCE: 7

```
Xaa Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
                20                  25                  30

Ala Met Ser Trp Val Arg Gln Ala Pro Gly Lys Gly Leu Glu Trp Val
            35                  40                  45
```

-continued

Ser Ala Ile Ser Gly Ser Gly Gly Asp Thr Tyr Tyr Ala Asp Ser Val
    50                  55                  60

Xaa Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Gly Tyr Gly Met Asp Val Trp Gly Gln Gly Thr Thr Val Thr
            100                 105                 110

Val Ser Ser
        115

<210> SEQ ID NO 8
<211> LENGTH: 112
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (28)..(28)
<223> OTHER INFORMATION: Xaa at position 28 is serine or aspartic acid.
<220> FEATURE:
<221> NAME/KEY: MISC_FEATURE
<222> LOCATION: (58)..(58)
<223> OTHER INFORMATION: Xaa at position 58 is asparagine or aspartic
      acid.

<400> SEQUENCE: 8

Asp Val Val Met Thr Gln Ser Pro Leu Ser Leu Pro Val Thr Leu Gly
1               5                   10                  15

Gln Pro Ala Ser Ile Ser Cys Arg Ser Ser Gln Xaa Leu Val His Ser
            20                  25                  30

Asp Gly Asn Thr Tyr Leu Met Trp Phe Gln Gln Arg Pro Gly Gln Ser
        35                  40                  45

Pro Arg Arg Leu Ile Tyr Lys Val Ser Xaa Arg Asn Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Met Gln Gly
                85                  90                  95

Thr Lys Gln Tyr Pro Thr Phe Gly Gln Gly Thr Lys Leu Glu Ile Lys
            100                 105                 110

<210> SEQ ID NO 9
<211> LENGTH: 441
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (1)..(1)
<223> OTHER INFORMATION: Xaa at position 1 is glutamic acid or
      pyroglutamic acid
<220> FEATURE:
<221> NAME/KEY: MISC_FEATURE
<222> LOCATION: (65)..(65)
<223> OTHER INFORMATION: Xaa at position 65 is lysine or glutamine.
<220> FEATURE:
<221> NAME/KEY: MISC_FEATURE
<222> LOCATION: (441)..(441)
<223> OTHER INFORMATION: Xaa at position 441 is glycine or absent.

<400> SEQUENCE: 9

Xaa Val Gln Leu Leu Glu Ser Gly Gly Gly Leu Val Gln Pro Gly Gly

-continued

```
1               5                   10                  15
Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
            35                  40                  45

Ser Ala Ile Ser Gly Ser Gly Gly Asp Thr Tyr Tyr Ala Asp Ser Val
            50                  55                  60

Xaa Gly Arg Phe Thr Ile Ser Arg Asp Asn Ser Lys Asn Thr Leu Tyr
65                      70                  75                  80

Leu Gln Met Asn Ser Leu Arg Ala Glu Asp Thr Ala Val Tyr Tyr Cys
                    85                  90                  95

Ala Arg Gly Tyr Gly Met Asp Val Trp Gly Gln Gly Thr Thr Val Thr
                    100                 105                 110

Val Ser Ser Ala Ser Thr Lys Gly Pro Ser Val Phe Pro Leu Ala Pro
                    115                 120                 125

Cys Ser Arg Ser Thr Ser Glu Ser Thr Ala Ala Leu Gly Cys Leu Val
                    130                 135                 140

Lys Asp Tyr Phe Pro Glu Pro Val Thr Val Ser Trp Asn Ser Gly Ala
145                     150                 155                 160

Leu Thr Ser Gly Val His Thr Phe Pro Ala Val Leu Gln Ser Ser Gly
                    165                 170                 175

Leu Tyr Ser Leu Ser Ser Val Val Thr Val Pro Ser Ser Ser Leu Gly
                    180                 185                 190

Thr Lys Thr Tyr Thr Cys Asn Val Asp His Lys Pro Ser Asn Thr Lys
                    195                 200                 205

Val Asp Lys Arg Val Glu Ser Lys Tyr Gly Pro Pro Cys Pro Pro Cys
210                     215                 220

Pro Ala Pro Glu Ala Ala Gly Gly Pro Ser Val Phe Leu Phe Pro Pro
225                     230                 235                 240

Lys Pro Lys Asp Thr Leu Met Ile Ser Arg Thr Pro Glu Val Thr Cys
                    245                 250                 255

Val Val Val Asp Val Ser Gln Glu Asp Pro Glu Val Gln Phe Asn Trp
                    260                 265                 270

Tyr Val Asp Gly Val Glu Val His Asn Ala Lys Thr Lys Pro Arg Glu
                    275                 280                 285

Glu Gln Phe Asn Ser Thr Tyr Arg Val Val Ser Val Leu Thr Val Leu
                    290                 295                 300

His Gln Asp Trp Leu Asn Gly Lys Glu Tyr Lys Cys Lys Val Ser Asn
305                     310                 315                 320

Lys Gly Leu Pro Ser Ser Ile Glu Lys Thr Ile Ser Lys Ala Lys Gly
                    325                 330                 335

Gln Pro Arg Glu Pro Gln Val Tyr Thr Leu Pro Pro Ser Gln Glu Glu
                    340                 345                 350

Met Thr Lys Asn Gln Val Ser Leu Thr Cys Leu Val Lys Gly Phe Tyr
                    355                 360                 365

Pro Ser Asp Ile Ala Val Glu Trp Glu Ser Asn Gly Gln Pro Glu Asn
                    370                 375                 380

Asn Tyr Lys Thr Thr Pro Pro Val Leu Asp Ser Asp Gly Ser Phe Phe
385                     390                 395                 400

Leu Tyr Ser Arg Leu Thr Val Asp Lys Ser Arg Trp Gln Glu Gly Asn
                    405                 410                 415

Val Phe Ser Cys Ser Val Met His Glu Ala Leu His Asn His Tyr Thr
                    420                 425                 430
```

```
Gln Lys Ser Leu Ser Leu Ser Leu Xaa
        435                 440

<210> SEQ ID NO 10
<211> LENGTH: 219
<212> TYPE: PRT
<213> ORGANISM: Artificial Sequence
<220> FEATURE:
<223> OTHER INFORMATION: Artificial Construct
<220> FEATURE:
<221> NAME/KEY: MISC_FEATURE
<222> LOCATION: (28)..(28)
<223> OTHER INFORMATION: Xaa at position 28 is serine or aspartic acid.
<220> FEATURE:
<221> NAME/KEY: MISC_FEATURE
<222> LOCATION: (58)..(58)
<223> OTHER INFORMATION: Xaa at position 58 is asparagine or aspartic
      acid.

<400> SEQUENCE: 10

Asp Val Val Met Thr Gln Ser Pro Leu Ser Leu Pro Val Thr Leu Gly
1               5                   10                  15

Gln Pro Ala Ser Ile Ser Cys Arg Ser Ser Gln Xaa Leu Val His Ser
            20                  25                  30

Asp Gly Asn Thr Tyr Leu Met Trp Phe Gln Gln Arg Pro Gly Gln Ser
        35                  40                  45

Pro Arg Arg Leu Ile Tyr Lys Val Ser Xaa Arg Asn Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Met Gln Gly
                85                  90                  95

Thr Lys Gln Tyr Pro Thr Phe Gly Gln Gly Thr Lys Leu Glu Ile Lys
            100                 105                 110

Arg Thr Val Ala Ala Pro Ser Val Phe Ile Phe Pro Pro Ser Asp Glu
        115                 120                 125

Gln Leu Lys Ser Gly Thr Ala Ser Val Val Cys Leu Leu Asn Asn Phe
    130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
        195                 200                 205

Pro Val Thr Lys Ser Phe Asn Arg Gly Glu Cys
    210                 215

<210> SEQ ID NO 11
<211> LENGTH: 1323
<212> TYPE: DNA
<213> ORGANISM: Homo sapiens

<400> SEQUENCE: 11
gaggtgcagc tgttggagtc tgggggaggc ttggtacagc ctggggggtc cctgagactc    60
tcctgtgcag cctctggatt cacctttagc agctatgcca tgagctgggt ccgccaggct   120
ccagggaagg ggctggagtg ggtctcagct attagtggta gtggtggcga cacatactac   180
```

-continued

```
gcagactccg tgaagggccg gttcaccatc tccagagaca attccaagaa cacgctgtat        240
ctgcaaatga acagcctgag agccgaggac acggccgtat attactgtgc gagggggctac       300 ggtatggacg tctggggcca agggaccacg gtcaccgtct cctcagcctc caccaagggc        360
ccatcggtct tccccgctag cgcctgctcc aggagcacct ccgagagcac agccgccctg        420
ggctgcctgg tcaaggacta cttccccgaa ccggtgacgg tgtcgtggaa ctcaggcgcc        480
ctgaccagcg gcgtgcacac cttcccggct gtcctacagt cctcaggact ctactccctc        540
agcagcgtgg tgaccgtgcc ctccagcagc ttgggcacga agacctacac ctgcaacgta        600
gatcacaagc ccagcaacac caaggtggac aagagagttg agtccaaata tggtccccca        660
tgcccaccct gcccagcacc tgaggccgcc gggggaccat cagtcttcct gttccccccca       720 aaacccaagg acactctcat gatctcccgg acccctgagg tcacgtgcgt ggtggtggac        780
gtgagccagg aagaccccga ggtccagttc aactggtacg tggatggcgt ggaggtgcat       840
aatgccaaga caaagccgcg ggaggagcag ttcaacagca cgtaccgtgt ggtcagcgtc        900
ctcaccgtcc tgcaccagga ctggctgaac ggcaaggagt acaagtgcaa ggtctccaac        960
aaaggcctcc cgtcctccat cgagaaaacc atctccaaag ccaaagggca gccccgagag       1020
ccacaggtgt acaccctgcc cccatcccag gaggagatga ccaagaacca ggtcagcctg       1080
acctgcctgg tcaaaggctt ctaccccagc gacatcgccg tggagtggga aagcaatggg       1140
cagccggaga caactacaa gaccacgcct cccgtgctgg actccgacgg ctccttcttc        1200
ctctacagca ggctaaccgt ggacaagagc aggtggcagg aggggaatgt cttctcatgc       1260
tccgtgatgc atgaggctct gcacaaccac tacacacaga gagcctctc cctgtctctg        1320 ggt                                                                     1323
```

<210> SEQ ID NO 12
<211> LENGTH: 657
<212> TYPE: DNA
<213> ORGANISM: Homo sapiens

<400> SEQUENCE: 12

```
gatgttgtga tgactcagtc tccactctcc ctgcccgtca cccttggaca gccggcctcc         60
atctcctgca ggtctagtca agcctcgta cacagtgatg gaaacaccta cttgatgtgg        120
tttcagcaga ggccaggtca atctccaagg cgcctaattt ataaggtttc taaccggaac        180
tctggggtcc cagacagatt cagcggcagt gggtcaggca ctgatttcac actgaaaatc        240
agcagggtgg aggctgagga tgttggggtt tattactgca tgcaaggtac aaagcagtac        300 cccactttg gccaagggac caagctggag atcaaacgga ccgtggctgc accatctgtc        360
ttcatcttcc cgccatctga tgagcagttg aaatctggaa ctgcctctgt tgtgtgcctg        420
ctgaataact tctatcccag agaggccaaa gtacagtgga aggtggataa cgccctccaa        480
tcgggtaact cccaggagag tgtcacagag caggacagca aggacagcac ctacagcctc        540
agcagcaccc tgacgctgag caaagcagac tacgagaaac acaaagtcta cgcctgcgaa        600
gtcacccatc agggcctgag ctcgcccgtc acaaagagct caacagggg gagtgc            657
```

<210> SEQ ID NO 13
<211> LENGTH: 140
<212> TYPE: PRT
<213> ORGANISM: Homo sapiens

<400> SEQUENCE: 13

Met Asp Val Phe Met Lys Gly Leu Ser Lys Ala Lys Glu Gly Val Val

-continued

```
1               5                   10                  15
Ala Ala Ala Glu Lys Thr Lys Gln Gly Val Ala Glu Ala Ala Gly Lys
            20                  25                  30

Thr Lys Glu Gly Val Leu Tyr Val Gly Ser Lys Thr Lys Glu Gly Val
        35                  40                  45

Val His Gly Val Ala Thr Val Ala Glu Lys Thr Lys Glu Gln Val Thr
    50                  55                  60

Asn Val Gly Gly Ala Val Val Thr Gly Val Thr Ala Val Ala Gln Lys
65                  70                  75                  80

Thr Val Glu Gly Ala Gly Ser Ile Ala Ala Ala Thr Gly Phe Val Lys
                85                  90                  95

Lys Asp Gln Leu Gly Lys Asn Glu Glu Gly Ala Pro Gln Glu Gly Ile
            100                 105                 110

Leu Glu Asp Met Pro Val Asp Pro Asp Asn Glu Ala Tyr Glu Met Pro
            115                 120                 125

Ser Glu Glu Gly Tyr Gln Asp Tyr Glu Pro Glu Ala
130                 135                 140
```